United States Patent [19]
Raiford et al.

[11] Patent Number: 5,898,046
[45] Date of Patent: Apr. 13, 1999

[54] FLUORINATED MELT ESTER ADDITIVES FOR THERMOPLASTIC FIBERS

[75] Inventors: Kimberly Gheysen Raiford, Hockessin; Theodor Arthur Liss, Wilmington; Edward James Greenwood, Hockessin, all of Del.

[73] Assignee: E. I. du Pont de Nemours and Company, Wilmington, Del.

[21] Appl. No.: 08/947,281

[22] Filed: Oct. 7, 1997

Related U.S. Application Data

[63] Continuation of application No. 08/579,042, Dec. 21, 1995, abandoned.

[51] Int. Cl.$^6$ ........................................... C08K 5/10
[52] U.S. Cl. ..................... 524/316; 524/319; 524/322; 524/462; 525/165; 525/178; 525/199
[58] Field of Search ..................... 524/316, 319, 524/322, 462

[56] References Cited

U.S. PATENT DOCUMENTS

| | | | |
|---|---|---|---|
| 3,716,401 | 2/1973 | Axelrod | 524/316 |
| 4,401,780 | 8/1983 | Steel | 524/225 |
| 4,426,476 | 1/1984 | Chang | 524/288 |
| 5,459,188 | 10/1995 | Sargent et al. | 524/319 |

FOREIGN PATENT DOCUMENTS 0196247  11/1983  Japan ....................................... 524/316

*Primary Examiner*—Ana Woodward

[57] ABSTRACT

A composition having repellency to low surface tension fluids comprising a material prepared by forming a mixture of a polymer selected from the group consisting of polyolefin, polyamide, polyester, polyacrylate, and blends and copolymers thereof, and a fluorochemical compound comprising a fluorocarbon/hydrocarbon ester of the formulae:

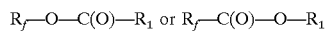

$$R_f\text{—O—C(O)—}R_1 \text{ or } R_f\text{—C(O)—O—}R_1$$

wherein $R_f$ is selected from the group consisting of:
1) $F(CF_2)_x\text{—}(CH_2)_m$ wherein x is from about 4 to about 20 and m is from about 0 to about 6; and
2) $F(CF_2)_x\text{—}SO_2N(R_2)\text{—}R_3$ where x is a positive integer from about 4 to about 20, $R_2$ is an alkyl radical of from about 1 to about 4 carbon atoms, $R_3$ is an alkylene radical of from about 1 to about 12 carbon atoms; and $R_1$ is an aliphatic hydrocarbon having from about 12 to about 76 carbon atoms; and provided that said fluorochemical compound is other than perfluoroalkylethyl stearate; and melt extruding the mixture.

6 Claims, No Drawings

FLUORINATED MELT ESTER ADDITIVES FOR THERMOPLASTIC FIBERS

This is a continuation of application Ser. No. 08/579,042 filed Dec. 21, 1995, now abandoned.

FIELD OF THE INVENTION

This invention relates to a process for imparting superior repellency of low surface tension fluids to thermoplastic polymers, in particular fibers, fabrics, nonwovens, films and molded articles by the addition of certain fluorinated esters to the polymer melt.

BACKGROUND OF THE INVENTION

Thermoplastic polymer fibers are frequently treated with fluorochemical compounds in order to affect the surface characteristics of the fiber, for example to improve water repellency or to impart stain or dry soil resistance. Most frequently, fluorochemical dispersions are applied topically to the fabrics made from these fibers by spraying, padding or foaming, followed by a drying step to remove water.

For example, a method is known for obtaining dry soil resistance and nonflame propagating characteristics in a textile fiber by applying topically aqueous dispersions of a variety of fluorinated esters derived from perfluoroalkyl aliphatic alcohols of the formula $C_nF_{2n+1}(CH_2)_mOH$ where n is from about 3 to 14 and m is 1 to 3, together with mono- or polycarboxylic acids which contain from 3 to 30 carbons and can contain other substituents. The fluorinated esters include, among others, a perfluoroalkylethyl stearate corresponding to "ZONYL" FTS, as well as perfluoroalkylethyl diesters made from dodecanedioic acid or tridecanedioic acid.

It is well recognized that the process of manufacturing thermoplastic polymeric fibers and fabrics could be simplified and significant capital investment could be eliminated if the topical application were replaced by incorporating a fluorochemical additive into the polymer melt prior to the extrusion of the fiber. The difficulty has been in finding suitably effective fluorochemical additives.

Thermoplastic polymers include, among others, polyolefins, polyesters, polyamides and polyacrylates. Polyolefins, and in particular polypropylene, are frequently used for disposable nonwoven protective garments, particularly in the medical/surgical field, in part because of a polyolefin's inherent water-repellency. However, polyolefins are not inherently good repellents for other lower surface tension fluids frequently encountered in the medical field such as blood and isopropyl alcohol. To get around this deficiency, fluorochemical dispersions are applied topically to these fabrics.

The requirements of an additive suitable for incorporating into a polyolefin melt include, besides the ability to repel low surface tension fluids at a low concentration of the additive, a satisfactory thermal stability and low volatility to withstand processing conditions. Preferably the compound will migrate to the surface of the fiber so as to minimize the amount of additive needed for adequate repellency. While this migration can often be enhanced by post-extrusion heating of the fiber, it is more preferable for the migration to occur without the need for this heating step. This requirement for mobility in the polymeric fiber in turn tends to limit the size of the fluorochemical molecule, and effectively eliminates from consideration high molecular weight polymeric fluorochemical additives.

The general concept of incorporating fluorochemical additives into a polyolefin fiber melt is known, but the difficulty in finding suitable effective additives has limited the application of this concept. Many of the past efforts to evaluate such fluorochemical additives have been aimed at improving other properties of the polyolefin, and do not teach methods of its improving repellency to low surface tension fluids.

Nonwoven composite structures are known consisting in part of two or more melt-extruded nonwoven layers, at least one of which includes an additive which imparts to the surface at least one characteristic different than the surface characteristics of the polymer alone as a result of preferential migration of the additive to the surface without the need for post-formation treatment of any kind. Examples of the additive-including layer include polypropylene modified by commercially available fluorochemical additives, including "ZONYL" FTS defined above.

U.S. Pat. Nos. 5,178,931 and 5,178,932 disclose specific nonwoven laminiferous and composite structures respectively, consisting in part of three melt-extruded nonwoven layers, the second of which includes an additive which imparts alcohol repellency as a result of preferential migration of the additive to the surface without the need for post-formation treatment of any kind, and where at least one of the first and third layers has been treated by topical application of an agent to change its characteristics in some way. Examples of the additive-including second layer include commercially available fluorochemicals, including "ZONYL" FTS.

Soil resistant polymeric compositions are known which are prepared by melt extrusion with a nonpolymeric fluorochemical dispersed throughout the polymer. The polymers used include polypropylene, polyethylene, polyamide and polyester, and the fluorochemical used is a perfluoroalkylstearate, in particular "ZONYL" FTS.

In addition, a polymeric composition is known comprising a mixture of a polymer selected from the group of polypropylene, polyethylene, polyamide and polyester with a fluorochemical comprising a fluorinated oleophobic, hydrophobic alkyl group attached to a nonfluorinated oleophilic alkyl, aryl, aralkyl or alkaryl moiety optionally through a linking moiety, which can be melt extruded as a mixture. A more specific description of the above fluorochemical is not disclosed, but among the many compounds which are applicable are esters where the oleophilic organic group contains from 2 to 35 carbon atoms. Examples of such are "ZONYL" FTS or a product made by transesterifying "ZONYL" BA with methyl stearate and methyl palmitate.

An automotive coating film is known containing an organic solvent-soluble waxy hydrocarbon which possesses a fluorine-containing organic group. This component is a product obtained by esterifying and coupling a high molecular weight alcohol with a carboxylic acid which possesses a fluorine-containing group or a product obtained by esterifying and coupling a high molecular weight fatty acid and an alcohol which possesses a fluorine-containing group. As examples of high molecular weight alcohols included are those with average carbon chain lengths with up to 50 carbons. As examples of high molecular weight fatty acids included are those with carbon chain lengths of up to 31 carbons (mellisic acid). The products were tested only as a waxing agent for automobiles.

Japanese Patent Application 3-41160 to Kao Corp. teaches a thermoplastic resin composition containing a perfluoroalkyl group-containing long chain fatty ester of the formula $R_f$—$R_1$—OCO—$R_2$ where $R_f$ is a perfluoroalkyl group with 5 to 16 carbons, $R_1$ is an alkylene group with 1 to 4 carbons, and $R_2$ is an unsaturated alkyl group or a saturated alkyl group with 21 to 50 carbons. One example reacts $C_8F_{17}C_2H_4OH$ with $C_{27}H_{55}COOH$ to produce the ester. The resins included polyethylene and polypropylene. Benefits of the additive were shown by the contact angle of water with molded articles of the resin. No tests are reported on the repellency to low surface tension fluids of the resulting polymers.

In summary, while the prior art discloses numerous examples of polyolefin fibers containing a fluorochemical additive incorporated at the melt stage to alter the surface characteristics of the extruded fiber, much of this was aimed at soiling and staining resistance, water repellency or other purposes. Those references which were aimed at imparting alcohol repellency to polyolefin fabrics employ "ZONYL" FTS. A need exists to achieve superior repellency to low surface tension fluids and superior product efficiency. The fluorinated compounds of the present invention meet this need.

SUMMARY OF THE INVENTION

The present invention comprises a composition and a process for imparting repellency of low surface tension fluids to thermoplastic polymer articles. The composition having repellency to low surface tension fluids of the present invention comprises a material prepared by:

forming a mixture of a polymer selected from the group consisting of polyolefin, polyamide, polyester, polyacrylate, and blends and copolymers thereof, and a fluorochemical compound comprising a fluorocarbon/hydrocarbon ester of the formulae:

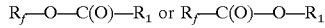

$R_f$—O—C(O)—$R_1$ or $R_f$—C(O)—O—$R_1$ wherein $R_f$ is selected from the group consisting of 1) $F(CF_2)_x$—$(CH_2)_m$ wherein x is from about 4 to about 20 and m is from about 0 to about 6, and 2) $F(CF_2)_x$—$SO_2N(R_2)$—$R_3$ wherein x is a positive integer from about 4 to about 20, $R_2$ is an alkyl radical of from 1 to about 4 carbon atoms, and $R_3$ is an alkylene radical of from 1 to about 12 carbon atoms and $R_1$ is an aliphatic hydrocarbon of from about 12 to about 76 carbon atoms; provided that said fluorochemical compound is other than perfluoroalkylethyl stearate; and melt extruding the mixture.

The present invention further comprises the above composition in the form of a filament, fiber, nonwoven fabric or web, film or molded article.

The present invention further comprises a process for imparting repellency of low surface tension fluids to a thermoplastic polymer article comprising forming a mixture prior to article formation of a polymer and an effective amount of a fluorochemical compound comprising a fluorocarbon/hydrocarbon ester as defined above and melt extruding the mixture. Such articles include filaments, fibers, nonwoven webs or fabrics, films or molded articles.

DETAILED DESCRIPTION OF THE INVENTION

Superior repellency to low surface tension fluids is imparted to thermoplastic polymer articles, in particular fibers, fabrics, filaments, nonwovens, films, and molded articles, by the addition of certain monomeric fluorinated ester compounds to a polymer prior to article formation and melt extruding the resulting mixture. This process is used either with or without post-extrusion heating of the article to promote movement of the additive to the article surface, since the ester compounds of this invention tend by their nature to concentrate on the surface.

The term "low surface tension fluids" is used herein to mean fluids having a surface tension of less than 50 dynes/cm ($50 \times 10^{-7}$ newton meter). Examples of such fluids include alcohols, blood, and certain body fluids.

The composition of the present invention comprises a material prepared by melt extruding a mixture of a polymer selected from the group consisting of polyolefin, polyamide, polyester, polyacrylate, and blends and copolymers thereof, and a fluorochemical compound, other than perfluoroalkylethyl stearate, comprising a fluorocarbon/hydrocarbon ester of the formulae:

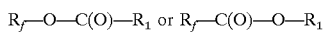

$R_f$—O—C(O)—$R_1$ or $R_f$—C(O)—O—$R_1$ wherein $R_f$ in the above formulas is $F(CF_2)_x$—$(CH_2)_m$ wherein x has a preferred average value of about 7 to 10 and a range of about 4 to about 20 and m has a value of 0 to 6.

Especially preferred for $R_f$ is a composition wherein the chain length distribution is as follows:

| | |
|---|---|
| x = 6 or less | 0–10% by weight |
| x = 8 | 45–75% by weight |
| x = 10 | 20–40% by weight |
| x = 12 | 1–20% by weight |
| x = 14 or greater | 0–5% by weight. |

This composition range, when m=2, and x has an average value of about 9, is hereinafter referred to as Telomer BN. This definition of $R_f$ in the formula $R_f$—OH is referred to as Telomer BN alcohol.

Alternatively $R_f$ is a fluorinated sulfonamide of the structure $F(CF_2)_x$—$SO_2N(R_2)$—$R_3$ wherein x is a positive integer from about 4 to about 20, preferably 4 to 10 inclusive, $R_2$ is an alkyl radical having from 1 to 4 carbon atoms, and $R_3$ is an alkylene radical having from 1 to 12 carbon atoms. Preferably $R_2$ is $CH_3$ and $R_3$ is —$CH_2CH_2$—, —$(CH_2)_3$—, or —$(CH_2)_4$—.

The fluoroalkyl portion of the alternative $R_f$ structure is a fluorinated, preferably saturated, monovalent, non-aromatic, aliphatic radical of at least three fully fluorinated connected carbon atoms in a chain. The chain in the radical is straight, branched, or, if sufficiently large, cyclic and is optionally interrupted by divalent oxygen atoms, hexavalent sulfur atoms, or trivalent nitrogen atoms bonded only to carbon atoms. A fully fluorinated aliphatic radical is preferred, but hydrogen or chlorine atoms are optionally present as substituents in the radical provided that not more than one atom of either is present in the radical for every two carbon atoms.

$R_1$ is an aliphatic hydrocarbon with a carbon chain length of about 12 to about 76 carbons, preferably from about 24 to about 50 carbons. Alcohols corresponding to $R_1$—OH are commercially available from Petrolite Corporation, Polymer Division Headquarters, 6910 E. 14th Street, Tulsa, Okla., USA 74112, under the trademark "UNILIN". "UNILIN" alcohols are fully saturated long chain linear alcohols. The approximate $R_1$ ranges of "UNILIN" 350, 425, 550 and 700 are 12 to 50, 14 to 58, 16 to 56 and 14 to 66, respectively. The average chain lengths for "UNILIN" 350, 425, 550 and 700 are about 24, 32, 40 and 48, respectively. These are preferred for use in the present invention. Acids corresponding to $R_1$—COOH are commercially available from Petrolite Corporation, Polymers Division Headquarters, 6910 E. 14th Street, Tulsa, Okla., 74112, under the trademark "UNICID".

The range of average chain lengths for "UNICID" 350, 425, 550 and 700 are 24–29, 29–37, 37–45 and 40–48, respectively. These are preferred for use in the present invention. More particularly the "UNILIN" and "UNICID" carbon chain lengths are as noted in Table A.

TABLE A

| UNILIN | Lit. Avg.* | GC DATA** | | |
|--------|-----------|-----------|--------|--------|
|        |           | % Alcohol | Range  | Average |
| 350    | C24–26    |           | C12–46 | C24–26 |
| 425    | C30–32    | 85.0      | C14–58 | C30–32 |
| 550    | C40–42    | 79.5      | C16–56 | C38    |
| 700    | C48–50    | 83.6      | C14–66 | C50    |

| UNICID | Lit. Avg.* | GC DATA** | | |
|--------|-----------|-----------|--------|--------|
|        |           | % Acid    | Range  | Average |
| 350    | C24–29    | 79.0      | C12–50 | C28–30 |
| 425    | C29–37    |           |        |        |
| 550    | C37–45    | 80.0      | C16–62 | C42–44 |
| 700    | C40–48    |           | C16–76 |        |

*Literature average
**Gas chromatography data

There are various methods by which the above compounds can be prepared, and the inventive process is not limited to a particular method of preparation. For example, the above compounds are conveniently made by reacting an appropriate fatty alcohol with the appropriate fluorocarbon acid to form an acid ester, or by reacting an appropriate fatty acid with the appropriate fluorocarbon alcohol. Other compounds in these groups are readily made by those skilled in the art by following similar processes.

The esters useful in this invention are mixed with thermoplastic polymers by adding them to pelletized, granular, powdered or other appropriate forms of the polymers and rolling, agitating or compounding the mixture to achieve a uniform mixture which is then melt extruded. Alternatively the esters are added to a polymer melt to form a mixture which is then melt extruded. The thermoplastic polymer is a polyolefin, polyester, polyamide, or polyacrylate. The thermoplastic polymer preferably is a polyolefin, mixture or blend of one or more polyolefins, a polyolefin copolymer, mixture of polyolefin copolymers, or a mixture of at least one polyolefin and at least one polyolefin copolymer. The thermoplastic polymer is more preferably a polyolefin polymer or copolymer wherein the polymer unit or copolymer unit is ethylene, propylene or butylene or mixtures thereof. Thus the polyolefin is preferably polypropylene, polyethylene, polybutylene or a blend or copolymer thereof.

The amount of the fluorinated compound to be added to the thermoplastic polymer is preferably between 0.1 and about 5% by weight of the polymer. Amounts above this range can be used but are unnecessarily expensive in relation to the benefit received. The blend is then melted and extruded into fibers, filaments, nonwoven webs or fabrics, films, or molded articles using known methods. The fluorine content of the fiber, filament, nonwoven fabric or web prepared therefrom, film or molded article is from about 200 ug/g to about 25,000 ug/g.

Extrusion is used to form various types of nonwovens. In particular, extrusion is used to form a melt blown nonwoven web of continuous and randomly deposited microfibers having an average diameter of approximately 0.1 to 10 microns, preferably in the range of about 3 to 5 microns. The melt extrusion is carried out through a die at a resin flow rate of at least 0.1 to 5 grams per minute per hole, with the microfibers being randomly deposited on a moving support to form the web.

In the above melt blowing process, polymer and a compound of the present invention are fed into an extruder where it is melted and passed through a die containing a row of tiny orifices. As the polymer emerges from the die, it is contacted by two converging, high-velocity hot air streams, which attenuate the polymer into a blast of fine, discontinuous fibers of 0.1 to 10 microns in diameter. The useful polymer throughputs or flow rates range from 0.1 to 5 grams per minute per hole. Typical gas flow rates range from 2.5 to 100 pounds per square inch ($1.72 \times 10^5$ to $6.89 \times 10^5$ Pa) per minute of gas outlet area. The air temperature ranges from about 400° F. (204° C.) to 750° F. (399° C.). Cooling air then quenches the fibers, and they are deposited as a random, entangled web on a moving screen which is placed 6 to 12 inches (15.2 to 30.5 cm) in front of the blast of fibers.

Melt blowing processes are described in further detail in articles by V. A. Wente, "Superfine Thermoplastic Fibers", Industrial and Engineering Chemistry, Vol. 48(8), pp 1342–1346 (1956); and by R. R. Buntin and D. T. Lohkamp, "Melt Blowing—A One-step Web Process for New Nonwoven Products", Journal of the Technical Association of the Pulp and Paper Industry, Vol. 56(4), pp 74–77 (1973); as well as in U.S. Pat. No. 3,972,759 to R. R. Buntin. The disclosures of these documents are hereby incorporated by reference.

The unique properties of a melt blown nonwoven web comprised of a random array of fine, entangled fibers include very large surface areas, very small pore sizes, moderate strength and light weight fabric structure. These properties make the nonwoven webs particularly suitable for such applications as medical fabrics where barrier properties as well as breathability and drape are important.

Extrusion is also used to form polymeric films. In film applications, a film forming polymer is simultaneously melted and mixed as it is conveyed through the extruder by a rotating screw or screws and then is forced out through a slot or flat die, for example, where the film is quenched by a variety of techniques known to those skilled in the art. The films optionally are oriented prior to quenching by drawing or stretching the film at elevated temperatures.

Molded articles are produced by pressing or by injecting molten polymer from a melt extruder as described above into a mold where the polymer solidifies. Typical melt forming techniques include injection molding, blow molding, compression molding and extrusion, and are well known to those skilled in the art. The molded article is then ejected from the mold and optionally heat-treated to effect migration of the polymer additives to the surface of the article.

An optional heating or annealing step can be conducted but is not required. The polymer melt or extruded fiber, filament, nonwoven web or fabric, film, or molded article is heated to a temperature of from about 25° C. to about 150° C. The heating in some cases may improve the effectiveness of the fluorochemical additive in imparting alcohol repellency.

The compositions of the present invention are useful in various fibers, filaments, nonwoven webs or fabrics, films and molded articles. Examples include fibers for use in fabrics and carpets, nonwoven fabrics used in protective garments used in the medical/surgical field, and molded plastic articles of many types. The process of the present invention is useful for imparting repellency of low surface tension fluids to various thermoplastic polymer articles such as filaments, fibers, nonwoven webs or fabrics, films and molded articles.

EXAMPLE 1

Synthesis of $R_f$—O—C(O)—$R_1$, wherein $R_f$ is an aliphatic fluorocarbon radical of formula $F(CF_2)_x(CH_2)_m$ where the average value of x is 9, m=2, and wherein $R_1$ has an average value of 32 carbon atoms.

A 250-mL flask was fitted with a mechanical stirrer, temperature control device, Dean-Stark trap, water condenser, nitrogen gas inlet tube and heating mantle. Into the flask were charged 79.1 g (0.15 mole) $F(CF_2)_n$ $CH_2CH_2OH$ where n=6–18, avg. n=9 and 89.4 g (0.15 mole) "UNICID" 425 Acid ($C_{29}$–$C_{37}$ aliphatic acid from Petrolite Corporation, 6910 E. 14th Street, Tulsa, Okla., USA, 74112, acid no.=94 mgKOH/g). The mixture was heated and held at 120° C. When the mixture was homogeneous, 0.3 g phosphorous acid and 0.12 g boric acid were added. The temperature was raised to 140–145° C. and held for approximately 87 hours with continuous removal of water. When a gas chromatographic analysis of the reaction mixture indicated that all telomer BN alcohol had reacted, the mixture was cooled slightly and discharged yielding 44.65 g (87%) of product. Infrared analysis confirmed the above structure. The product was a tan solid and melted at 66.65° C. by Differential Scanning Calorimetry (DSC). The percent fluorine found by analysis was 32.4% compared to a theoretical analysis of 33.4%.

EXAMPLES 2–15

These examples were prepared using the procedure of Example 1. Table 2 lists the acid from which the fluoroester was prepared and the fluorocarbon distribution of the alcohol. All examples were used to prepare melt blown nonwoven webs and tested for alcohol repellency as described in Example 16:

EXAMPLE 16

Step 1

Preparation of the Polymer Blend

Uniform mixtures of the fluorochemical additives produced in Examples 1–16 together with a polyolefin were prepared by combining them and rolling the mixture for about 24 hours. Comparative examples A–D used the monoester "ZONYL" FTS and were prepared in a similar manner. In particular, for the compound of Example 4, a uniform mixture of 16.1 g (1.2 weight %) of finely ground compound of Example 4, and 1,349 g Escorene PD3746G (Exxon Chemical Americas, P.O. Box 3273, Houston, Tex. 77001) polypropylene resin having a melt flow rate of approximately 1000 was prepared by rolling the mixture for 24 hours. The fluorine concentration in the mixture was calculated to be 3300 µg/g fluorine. Actual fluorine concentration in the nonwoven web was 2930 µg/g fluorine. Comparative examples, designated A–D were prepared in the same manner.

Step 2

Melt Blown Web Formation

Melt blown nonwoven webs were prepared from the above mixtures using a 6-inch (15 cm) melt blowing pilot unit at a polymer feed rate of about 0.4 gram/minute/hole. The polymer blends were fed into the extruder having three barrel zones at temperatures ranging from 175° C. to 250° C. The temperature at the die was from 200° C. to 260° C. and the air temperature at the die varied from 200° C. to 270° C. The die tip gap was 0.060 inches (0.15 cm) and the primary air pressure was 2.6 psi ($17.9 \times 10^3$ Pa). The webs were formed on a drum coated with "TEFLON" at an output of 0.4 gram/hole/minute and collected on a take-up roll operating at 30 feet/minute(914 cm/minute) which resulted in the fabrics having a basis weight of 1.0 oz./square yard (34 gm/square meter).

Step 3

Repellency Testing

The water repellent properties of the melt blown webs were measured using an isopropyl alcohol/water test and are expressed in terms of percent isopropyl alcohol rating. Webs that resisted penetration of a 100% isopropyl alcohol/0% water solution (lowest surface tension fluid) after 1–2 minutes were given the highest rating of 100. Webs that are only resistant to a 100% water/0% isopropyl alcohol solution after 1–2 minutes are given the lowest rating of 0. Table 1 lists ratings that correspond to other isopropyl alcohol/water mixtures used in this test. The rating for a given fabric corresponds to the lowest surface tension fluid (greatest % isopropyl alcohol/water solution) that does not wet the fabric after 1–2 minutes.

TABLE 1

| Percent Isopropyl Alcohol Ratings | |
|---|---|
| Rating | % Isopropyl alcohol/ % water (vol/vol) |
| 100 | 100/0 |
| 90 | 90/10 |
| 80 | 80/20 |
| 70 | 70/30 |
| 60 | 60/40 |
| 50 | 50/50 |
| 40 | 40/60 |
| 30 | 30/70 |
| 20 | 20/80 |

To evaluate in-process repellency, the webs were rated immediately after exiting the melt blown line and then after two days and after about one week. Table 2 summarizes the percent isopropyl alcohol data for the polypropylene melt blown webs containing the esters of Examples 1–15 and the comparison examples A–D containing "ZONYL" FTS available from E. I. du Pont de Nemours and Company, Wilmington, Del., at different fluorine concentration levels. Also included in the table is a polypropylene control sample (PP Control).

The results in Table 2 showed the clear advantage of the inventive composition over the comparative and control samples, the advantages showing up immediately and over time. A related advantage for the inventive composition is better performance at lower levels of fluorochemical additive.

TABLE 2

Isopropyl Alcohol Repellency of Polypropylene Melt Blown Webs

| Example | Dist[1] | Acid | μg/g Fluorine Target/Actual | Isopropyl alcohol repellency | | | Heated[2] |
|---|---|---|---|---|---|---|---|
| | | | | As made | 2 days | 1 week | |
| 1 | BN | "UNICID" 350 | 1500/1480 | 40 | — | 90–100 | 30[a] |
| 2 | BL | "UNICID" 350 | 1700/1480 | 40 | — | 80 | 30[a] |
| 3 | BN | "UNICID" 425 | 3300/2930 | 90 | 90–100 | 90–100 | 90[b] |
| 4 | BN | "UNICID" 425 | 3300/3120 | 40 | 80 | 90 | 90[b] |
| 5 | BN | "UNICID" 550 | 3300/2720 | 100 | 100 | 100 | 100[b] |
| 6 | BN | "UNICID" 550 | 3300/2790 | 40 | 60 | 90 | 90[b] |
| 7 | BN | "UNICID" 550 | 1980/1910 | 70–80 | | | 100[a] |
| 8 | BL | "UNICID" 550 | 1980/1570 | 60 | — | — | 92[a] |
| 9 | BN | "UNICID" 700 | 3300/3210 | 100 | 100 | 100 | 100[c] |
| 10 | BN | "UNICID" 700 | 4500/2760 | 40 | | 40 | 100[b] |
| 11 | BN | "UNICID" 700 | 1980/1780 | 50–60 | 80 | 90 | 70[c] |
| 12 | BN | Stearic | 3300/2940 | 70 | 80–90 | 90–100 | 80[b] |
| 13 | BN | Stearic | 3300/3510 | 30 | 60 | 80 | 70[b] |
| 14 | M | "UNICID" 550 | 1980/1550 | 40 | 50 | 80 | 50[a] |
| 15 | M | Stearic | 1980/1610 | 30 | 40 | | 30[a] |
| A | B | Stearic | 3300/3050 | 70 | 80–90 | 90 | 80[b] |
| B | B | Stearic | 3300/3010 | 30 | 60 | 80 | 60–70[b] |
| C | B | Stearic | 2875/2426 | 40 | 80 | 80 | 80[b] |
| D | B | Stearic | 2423/1910 | 30 | 70 | 70–80 | 80–90[b] |
| Control | | | | 20 | 20 | 20 | |

[1]Fluorocarbon atom distribution: BL = $C_4F_9$—$C_8F_{17}$; B = $C_4F_9$—$C_{18}F_{37}$; BN = $C_8F_{17}$—$C_{12}F_{25}$; M = $C_8F_{17}SO_2N(CH_2H_5)$—$(CH_2)_2$—OH
[2]Annealing process:
[a]Web was annealed at 176 F. (80° C.) for 15 seconds shortly after processing
[b]Web was annealed at 140 F. (60° C.) for 25 hours about one week after processing
[c]Web was annealed at 180 F. (82.20° C.) for 1 minute shortly after processing

What is claimed is:

1. A composition comprising a material prepared by:
   forming a mixture of a polymer selected from the group consisting of polyolefin, polyamide, polyester, polyacrylate, and blends and copolymers thereof, and a fluorochemical ester composition of the formulae:

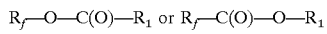
   $R_f$—O—C(O)—$R_1$ or $R_f$—C(O)—O—$R_1$ wherein
   $R_f$ is selected from the group consisting of:
   1) $F(CF_2)_x$—$(CH_2)_m$ wherein x is from about 4 to about 20 and m is from about 0 to about 6; and
   2) $F(CF_2)_x$—$SO_2N(R_2)$—$R_3$ wherein x is a positive integer from about 4 to about 20, $R_2$ is an alkyl radical of from 1 to about 4 carbon atoms, and $R_3$ is an alkylene radical of from 1 to about 12 carbon atoms; and
   $R_1$ is an aliphatic linear hydrocarbon having an average of from 30 to about 50 carbon atoms;
   and melt extruding the mixture,
   wherein said composition is repellent to fluids having a surface tension of less than 50 dynes/cm.

2. The composition of claim 1 wherein the polymer is selected from the group consisting of polyolefin, mixture of polyolefins, olefin copolymer, mixture of olefin copolymers, and mixture of at least one polyolefin and at least one olefin copolymer.

3. The composition of claim 2 wherein the polymer has a polymer unit which is ethylene, propylene, butylene, or a mixture thereof.

4. The composition of claim 1 wherein $R_f$ is $F(CF_2)_x(CH_2)_m$ wherein x is an average of about 9, and m is 2.

5. The composition of claim 1 wherein the fluorochemical is present in an amount of from about 0.1% to about 5% by weight of the polymer.

6. The composition of claim 1 having a fluorine content of from about 200 ug/g to about 25,000 ug/g.

* * * * *